Patented Nov. 14, 1944

2,362,934

UNITED STATES PATENT OFFICE 2,362,934

MASTIC FLOOR TILE COMPOSITIONS

Raymond F. Schlaanstine, Kennett Square, Pa., assignor to Hercules Powder Company, Wilmington, Del., a corporation of Delaware No Drawing. Application December 5, 1941, Serial No. 421,772

7 Claims. (Cl. 260—23)

This invention relates to compositions suitable for use in the manufacture of mastic tile; more particularly, it relates to new and improved plasticizers for use in mastic tile compositions.

Mastic tile compositions as they are known in the art consist normally of binding agents, plasticizing agents, asbestos and various non-fibrous mineral fillers and pigments. The binding agents in common use comprise asphaltic materials such as gilsonite and, when light-colored tiles are desired, polymeric resinous materials such as coumarone-indene resins, etc., have been employed. In conjunction with these materials, however, a suitable plasticizing agent must be employed. However, the plasticizing agents used heretofore such as stearine pitch, fish oil pitch, corn oil foots, whale oil pitch, linseed oil foots, cottonseed pitch, drying oil gels, etc., have all been found to have deficiencies in some respects. In the first place they do not possess the requisite resistance to the alkaline soaps and detergents used in floor cleaning. Furthermore, they do not have sufficient wetting power for the asbestos and mineral fillers normally employed to confine their use in the tile composition to relatively small amounts. The result is a finished tile having poor resistance to cold flow. Still another difficulty encountered in the use of these plasticizing agents is the fact that the resulting tiles have poor dimensional stability. For example, a tile containing stearine pitch will vary in its dimensions markedly in damp weather as compared with its dry weather dimensions. This necessarily increases the labor in laying the tile and detracts from the normally pleasing appearance of the finished floor.

In accordance with this invention, it has been found that highly satisfactory mastic floor tiles may be prepared by employing a combination plasticizer comprising a plasticizer which contributes a toughening effect to the composition and either a liquid rosin ester or a liquid hydrogenated rosin ester. The toughening plasticizer may be any of the plasticizers mentioned heretofore. These toughening plasticizers are characterized by the ability to contribute film strength to the composition in their own right and in addition are often characterized by having a gel structure. It has been found that when such a toughening plasticizer is used in conjunction with a minor proportion of liquid rosin ester or liquid hydrogenated rosin ester in the manufacture of tile compositions, the results are very advantageous and the disadvantages discussed above are rarely encountered.

Floor tiles prepared in accordance with the above process have been found to have good initial and permanent resistance to alkaline soaps and detergents used in floor cleaning. The liquid rosin esters or hydrogenated rosin esters, as the case may be, in the finished tile impart the characteristic of resistance to saponification by alkalies and weak acids. This characteristic makes unnecessary the practice ofttimes employed in the manufacture of these tiles of applying a coat of a highly alkali resistant varnish to the surface of the tile as the final step in the manufacture. Due to the excellent wetting power of the liquid esters of the invention for the asbestos and fillers commonly used in connection therewith, appreciably smaller amounts of total plasticizing agent are required. This is a highly important factor. Since the plasticizing agent is the relatively expensive constituent of mastic tile compositions, the invention provides an economic advantage.

Additionally, the cold flow of the finished tile is definitely decreased. This enables the production of a tile which will tend to keep its original shape under conditions of normal use. Such tile will withstand the pressure of tables and chairs upon them without any substantial deformation. At the same time the flexibility and impact strength of the resulting tiles at normal temperatures or lower have been found to be materially improved for a given melting point or softening point of the tile composition. Precisely, what this means is that tile compositions prepared using liquid rosin or hydrogenated rosin esters show better flexibility and impact strength than do similar tile compositions prepared with the use of sufficient prior art plasticizer such as stearine pitch to give a tile composition having the same melting point or softening point.

The rosin esters and hydrogenated rosin esters contemplated are liquid at normal temperatures (20° C.). The rosin esters will be prepared by the esterification of rosin with various monohydric and polyhydric alcohols by methods known in the art. The hydrogenated rosin esters may be prepared by alternative methods, as esterification of the rosin followed by hydrogenation of the ester or hydrogenation of the rosin followed by esterification. Hydrogenation of the rosin or rosin ester, as desired, will be accomplished by treatment of the material in molten form or in solution in a volatile organic solvent with gaseous hydrogen in the presence of a hydrogenation catalyst, as the noble metal catalysts, platinum, rhodium, iridium, ruthenium, palladium, osmium; the base metal catalysts, nickel, nickel-aluminum, nickel-silicon, etc.; also the copper chromite type catalysts. It is contemplated in the aforesaid esterification or hydrogenation processes that rosin in any of its available forms, as wood rosin, gum rosin, commercial abietic acid, etc. be employed; also that all the rosin acids found in any of the aforesaid rosins be considered equivalents. Thus, abietic, pimaric, sapinic, sylvic acids, etc., may be employed.

The following is a list of liquid rosin and hydrogenated rosin esters which may suitably be employed in accordance with the invention. It will be understood, however, that the same is not intended to be exhaustive and that the invention in its true spirit contemplates any rosin ester or hydrogenated rosin ester which is liquid at normal temperature (20° C.). The esters of abietic acid are given as illustrative. Thus, esters with lower aliphatic monohydric alcohols, as methyl abietate, ethyl abietate, n-propyl abietate, isopropyl abietate, n-butyl abietate, isobutyl abietate, sec-butyl abietate, sec-amyl abietate, isoamyl abietate, allyl abietate, etc.; esters with glycols having ether linkages, as diethylene glycol monoabietate, triethylene glycol monoabietate, etc.; esters with aromatic and aralkyl alcohols, as phenyl abietate, alpha-naphthyl abietate, beta-naphthyl abietate, benzyl abietate, etc.; esters with alicyclic alcohols, as cyclohexyl abietate, etc. may be employed. Any of the corresponding hydrogenated esters of abietic acid may be employed.

The hydrogenated esters are preferred since it has been found that floor tiles prepared with their use show the greatest stability over extended periods of time. Furthermore, it is preferred to employ a hydrogenated rosin ester wherein at least 30% of the double bonds of the rosin nucleus has been saturated with hydrogen. As exemplary, a rosin or rosin ester may be hydrogenated to the extent that from 65% to 70% of the double bonds of the rosin or rosin nucleus, respectively, become saturated when the rosin or rosin ester dissolved in glacial acetic acid is subjected to treatment with hydrogen at 50 to 60 lbs./sq. in. pressure and at 30° C. in contact with a supported platinum catalyst for about 30 minutes. Hydrogenated methyl abietate, having at least 70% of the double bonds saturated with hydrogen has given the best results of all the liquid esters.

As stated previously, the major proportion of the total plasticizer in the composition will consist of a so-called toughening plasticizer, and it is preferred that the amount of toughening plasticizer employed be between about 60% and about 95% by weight of the total plasticizer. Correspondingly it is preferred that the amount of liquid rosin ester or liquid hydrogenated rosin ester employed be between about 5% and about 40% by weight of the total plasticizer. The toughening plasticizers referred to above cover a rather wide range of materials and comprise those materials which contribute some film strength to the compositions in their own right. Many of these toughening plasticizers have a gel structure and are of a rubbery nature. They include pitches derived from vegetable oils, such as, cottonseed pitch, linseed oil foots, corn oil pitch, etc.; pitches derived from animal fats and oils, such as, stearine pitch, fish oil pitch, whale oil pitch, etc.; pre-oxidized drying and semidrying oils oxidized to gels, such as, pre-oxidized linseed oil, a pre-oxidized mixture of linseed and menhaden fish oil, pre-oxidized soybean oil, etc. A process for the pre-oxidation of drying and semidrying oils is fully described in U. S. Patent 2,022,707 to E. Claxton and M. Bare.

The binding agents which will be employed in the new compositions of the invention may be any of those heretofore employed in the art. For many purposes, particularly where the object is not to produce colored tiles, the asphaltic binders may be suitably employed. Hence, native asphalts, as gilsonite, Trinidad, run elaterite, etc.; asphaltic pyrobitumens, as elaterite, wurtzilite, etc.; petroleum asphalts; vacuum-distilled asphalts; steam-distilled asphalts; air blown asphalts, wax tailings from non- or semiasphaltic petroleums, solvent refined asphalts, etc., may be used. Where it is desired to obtain colored tiles and particularly light-colored tiles, it is preferred to employ binding agents such as polymerization products of coumarone-indene mixtures. These resinous polymers are known commercially as cumar resins. Those having melting points by the drop method of between about 90° C and about 116° C. are the most desirable. Other resins which may be employed are the glycerol ester of rosin, rosin, dammar resin, kauri resin, unmodified phenol-aldehyde resins, rosin modified phenol-aldehyde resins, rosin modified maleate resins, vinyl resins, urea-formaldehyde resins, etc.

Various kinds of mineral fillers may be utilized in the compositions. Both fibrous and non-fibrous mineral fillers may be used although it is customary to always employ asbestos fibers as one of the ingredients. When non-fibrous fillers are employed, they are usually in conjunction with a major proportion of asbestos fiber. Suitable non-fibrous fillers comprise barytes, china clay, silica, whiting, calcium carbonate, asbestine, slate dust, etc. In addition to the fillers, various pigments may be employed in the composition to impart thereto the desired color, as for example, titanium dioxide, carbon black, iron oxide, lead chromate, etc.

In the actual preparation of the tile compositions, the liquid rosin ester or hydrogenated rosin ester, toughening plasticizer, binding agents, mineral fillers and pigments are commingled and then heated at an elevated temperature until a more or less homogeneous mass is formed. The temperature employed will of necessity be above that necessary to soften or melt the binding agent or agents employed, and normally will be between about 150° C. and 200° C. The commingling and heating to obtain a uniform mass may be accomplished by mastication upon heated rolls or in heated mixers of, for example, the Banbury type. After a homogeneous mass has been obtained, it is fed into suitable sheet forming machines, and thereafter given a calendering process. The bottom roll of the calender usually will have a temperature below 100° F. A doctor knife cuts the sheet from the calender after which the sheet is dried or cut to proper size.

Various proportions of the aforementioned constituents may be combined to form suitable compositions for the production of mastic tile in accordance with the invention. The following general formula is given to illustrate the variations possible.

| | Percentage composition |
|---|---|
| Total plasticizer | 5 to 20 |
| Binding agent | 10 to 30 |
| Asbestos | 30 to 70 |
| Non-fibrous mineral filler and pigment | 0 to 40 |

The following specific example is illustrative of the invention. All parts and percentages are by weight unless otherwise indicated.

Using the following raw material formula, a homogeneous mass was formed by mastication on heated rolls at about 160° C.:

| | Parts |
|---|---|
| Cumar resin | 24 |
| Stearine pitch | 12 |
| Hydrogenated methyl abietate | 4 |
| Limestone | 24 |
| Asbestos fiber | 36 |

After the homogeneous mass was obtained, it was fed into a suitable sheet forming machine and the resulting sheet subjected to a calendering process. A doctor knife cut the sheet from the calender after which the sheet was cut into small squares. The tiles so prepared were found to be completely resistant to alkaline soaps and detergents used in floor cleaning. They were substantially completely resistant to the action of dilute alkalies and dilute acids. Moreover, the tiles so prepared retained this resistance to alkaline soaps, dilute alkalies and acids over long periods of time showing a permanent resistance to these reagents. Due to the excellent wetting power of the hydrogenated methyl abietate for the asbestos and limestone, much smaller amounts of total plasticizer were required than would have been the case had the liquid ester been omitted from the formulation. The tiles show excellent cold flow resistance and were not deformed under conditions of normal use. Furthermore, the tiles showed better flexibility and impact strength characteristics as compared with prior art tiles of similar melting point or softening point.

Certain advantages in addition to those hereinbefore mentioned are inherent in the compositions of this invention inasmuch as liquid rosin esters and hydrogenated rosin esters are very light in color. For example, hydrogenated methyl abietate as produced commercially has a color of 5 Amber on the Lovibond scale. The use of these plasticizers therefore facilitates the production of light-colored tile and tile having striated or variegated effects. The liquid hydrogenated rosin esters are particularly advantageous inasmuch as tiles containing them are not subject to oxidation and consequent decomposition as are the unsaturated oil- and pitch-containing tiles heretofore employed. This tends to eliminate warping and consequent breakage of the tiles upon aging. Furthermore, tiles containing liquid rosin esters and hydrogenated rosin esters have good original dimensional stability. Their susceptibility to moisture is not such that they vary in size appreciably with the humidity, hence these tiles may be employed more advantageously.

In this specification where the percentage hydrogen saturation of rosin is referred to, there is contemplated a value based on the assumption that the rosin consists entirely of abietic acid having two double bonds per molecule. Correspondingly, the percentage hydrogen saturation of rosin esters is on the basis that the ester consists entirely of the ester of abietic acid.

This application is a continuation-in-part of my application for U. S. Letters Patent, Serial No. 385,133, filed March 25, 1941.

What I claim and desire to protect by Letters Patent is:

1. A mastic tile comprising essentially a binder selected from the group consisting of asphalts and coumarone-indene resins, asbestos fiber, and a plasticizer for the binder in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of a material selected from the group consisting of liquid rosin esters and liquid hydrogenated rosin esters to improve the wetting power of the plasticizer for the fiber.

2. A mastic tile comprising essentially a binder selected from the group consisting of asphalts and coumarone-indene resins, asbestos fiber, and a plasticizer for the binder in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of hydrogenated methyl abietate to improve the wetting power of the plasticizer for the fiber.

3. A mastic tile comprising essentially a binder selected from the group consisting of asphalts and coumarone-indene resins, asbestos fiber, and a plasticizer for the binder in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of methyl abietate to improve the wetting power of the plasticizer for the fiber.

4. A mastic tile comprising essentially a binder selected from the group consisting of asphalts and coumarone-indene resins, asbestos fiber, and a plasticizer for the binder in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of diethylene glycol monoabietate to improve the wetting power of the plasticizer for the fiber.

5. A mastic tile comprising essentially asbestos fiber, coumarone-indene resin, and plasticizer therefor in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of hydrogenated methyl abietate to improve the wetting power of the plasticizer for the fiber.

6. A mastic tile comprising essentially asbestos fiber, coumarone-indene resin, and plasticizer therefor in an amount contributing a toughening effect, the said plasticizer consisting of between about 60% and about 95% by weight of a toughening plasticizer selected from the group consisting of gelled drying oils, pitches derived from vegetable oils, and pitches derived from animal fats and oils, and between about 40% and about 5% by weight of methyl abietate to improve the wetting power of the plasticizer for the fiber.

7. A mastic tile comprising essentially coumarone-indene resin, asbestos fiber, and plasticizer in an amount contributing a toughening effect, said plasticizer consisting of between about 60% and about 95% by weight of stearine pitch and between about 40% and about 5% by weight of hydrogenated methyl abietate to improve the wetting power of the pitch for the fiber.

RAYMOND F. SCHLAANSTINE.